United States Patent [19]

Parker

[11] Patent Number: 5,160,827
[45] Date of Patent: Nov. 3, 1992

[54] AUTOMOTIVE WINDSHIELD DEICE APPARATUS

[76] Inventor: Darren L. Parker, 1575 Parker Rd., Nixa, Mo. 65714

[21] Appl. No.: 740,709

[22] Filed: Aug. 6, 1991

[51] Int. Cl.[5] .......................... B60J 1/20; E06B 7/12; H05B 3/36
[52] U.S. Cl. ..................... 219/203; 52/171; 219/202; 219/528; 219/536; 296/84 R; 296/95 C; 296/97 D; 296/97 E; 392/347; 392/372
[58] Field of Search .............. 219/203, 528, 202, 536; 392/347, 372; 52/171; 296/95 R, 95 C, 95 Q, 97 R, 97 H, 84 R, 84 E, 97 D

[56] References Cited

U.S. PATENT DOCUMENTS

| | | | |
|---|---|---|---|
| 1,606,526 | 11/1926 | Graham | 219/203 |
| 1,743,638 | 1/1930 | Tefft | 219/203 X |
| 1,916,895 | 7/1933 | Rowe | 219/203 |
| 3,594,547 | 7/1971 | Quinn | 219/203 X |
| 3,636,311 | 1/1972 | Steger | 219/203 X |
| 4,399,347 | 8/1983 | Schmitt | 219/203 |

FOREIGN PATENT DOCUMENTS 2949667  7/1980  Fed. Rep. of Germany ...... 219/203

Primary Examiner—Anthony Bartis
Attorney, Agent, or Firm—Leon Gilden

[57] ABSTRACT

A flexible sheet member is mounted to an interior surface of a vehicular windshield, with the sheet member including a serpentine resistance heater directed therethrough in electrical communication with the associated vehicle. A rheostat effects selective heating in the resistance element. Further, a modification of the invention includes directional air conduits mounted to an interior surface of the sheet member to direct heated air within the passenger compartment, wherein the tubes include conduits, and the conduits each selectively mount a cap member at an upper terminal end thereof, wherein each cap member includes a pivotally mounted directing tube to selectively direct heated air throughout the vehicular passenger compartment.

2 Claims, 4 Drawing Sheets

RHEOSTAT

ELECTRIC HEATING ELEMENT

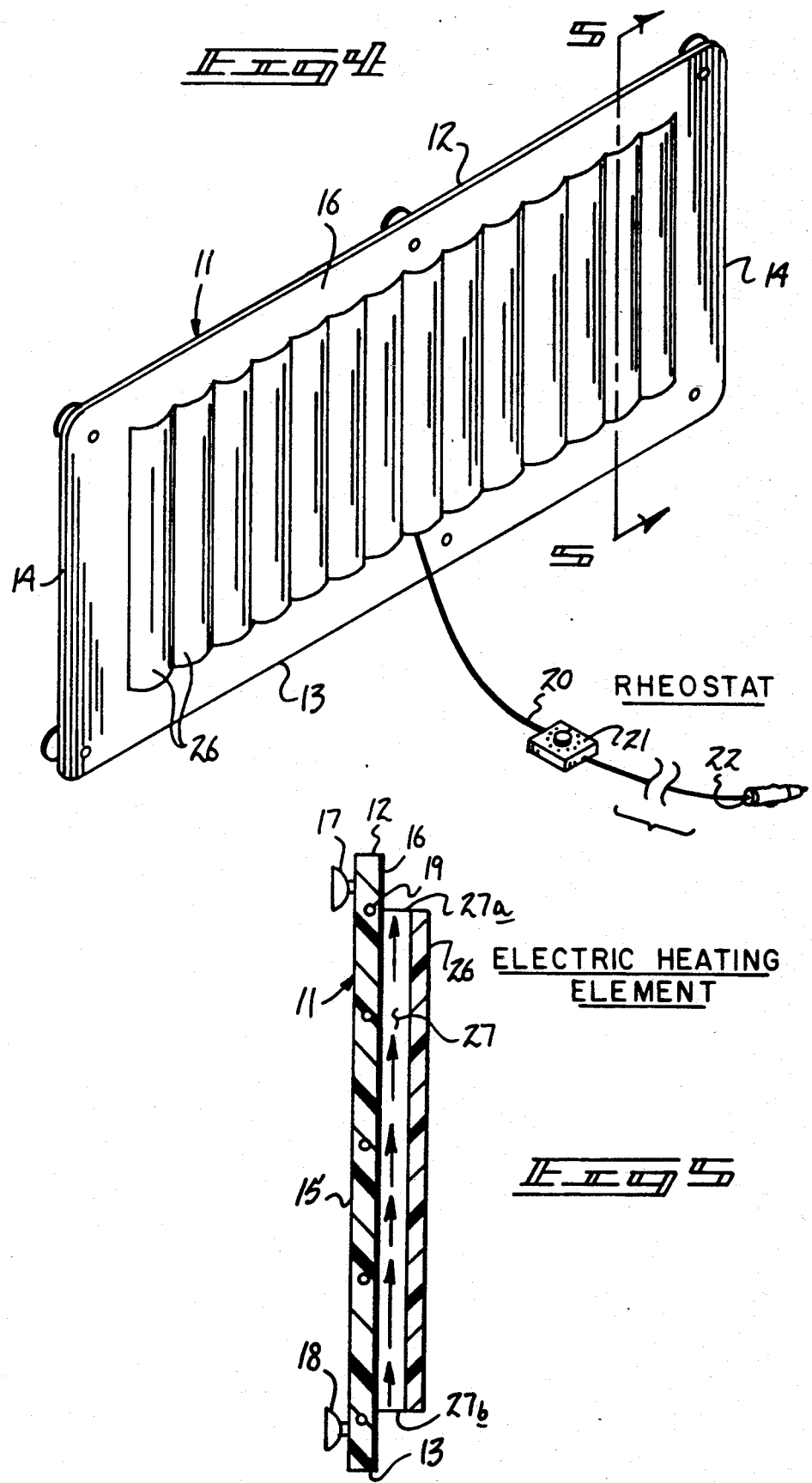

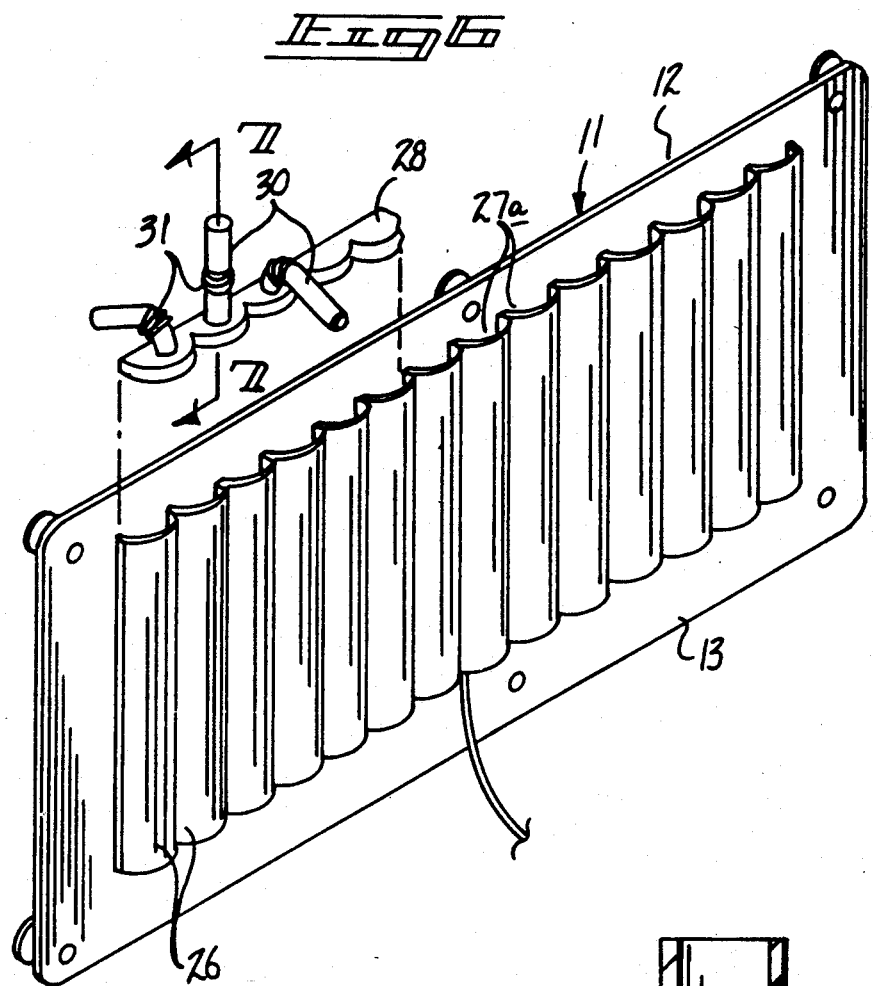
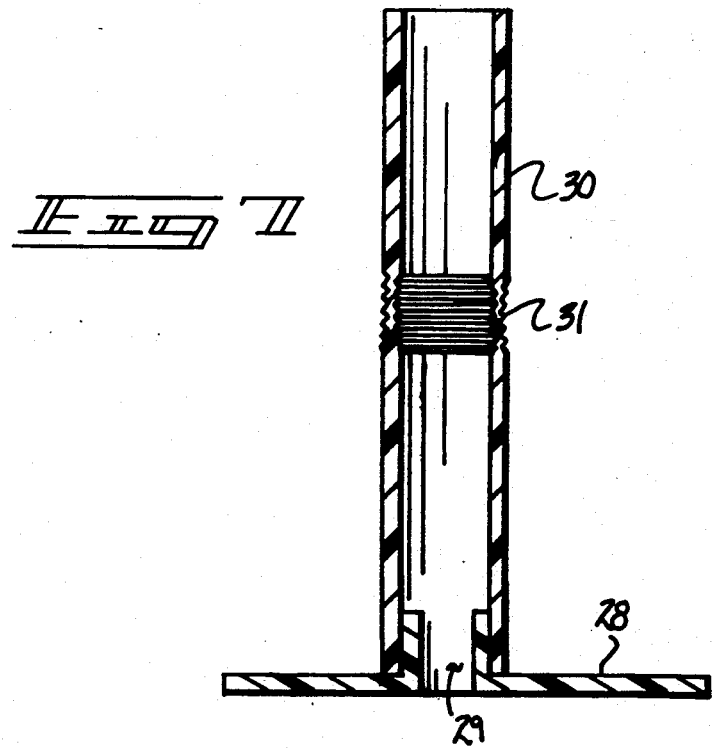

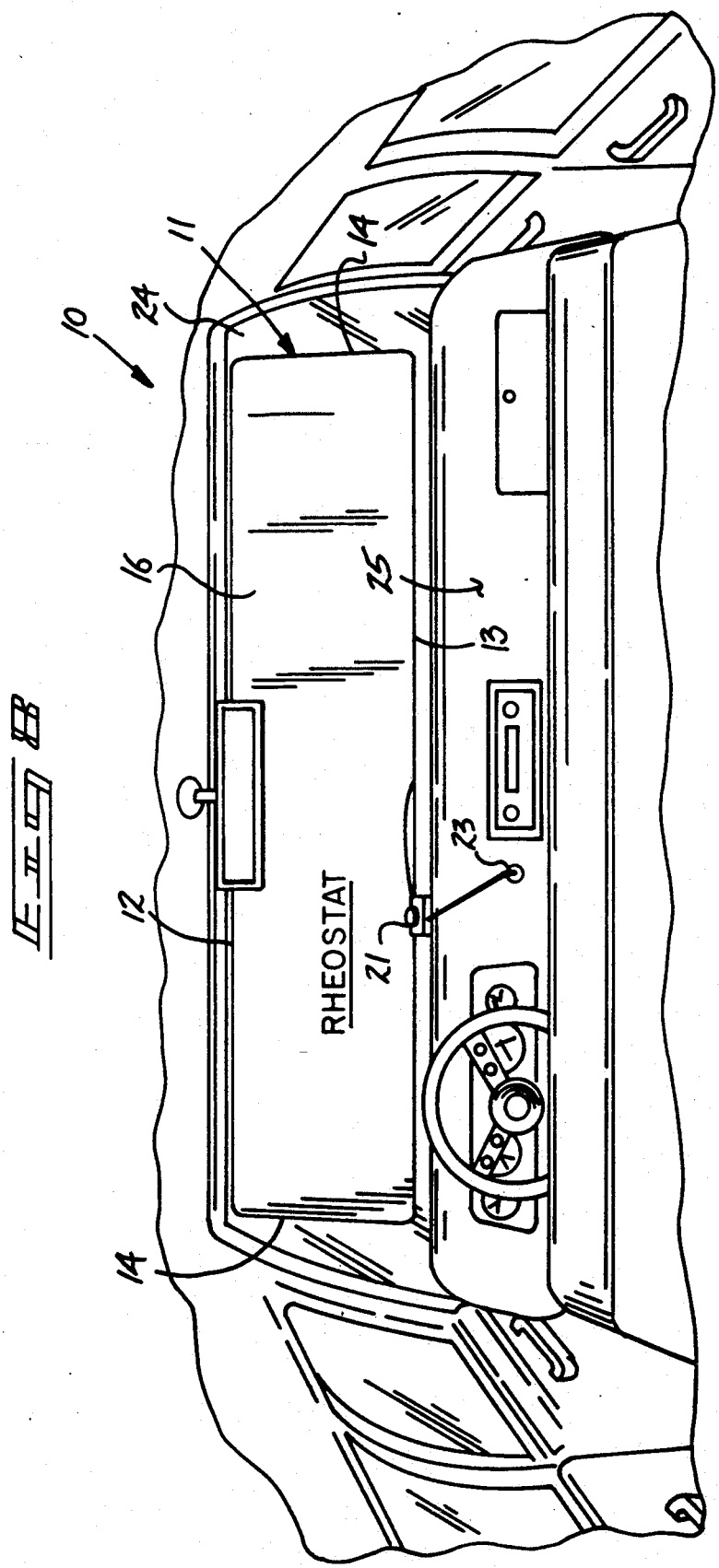

AUTOMOTIVE WINDSHIELD DEICE APPARATUS

BACKGROUND OF THE INVENTION

1. Field of the Invention

The field of invention relates to vehicular windshield apparatus, and more particularly pertains to a new and improved automotive windshield deice apparatus wherein the same is arranged to effect selective heating to an interior surface of a vehicular windshield preventing icing of the windshield.

2. Description of the Prior Art

Various devices are utilized in the prior art mounted to a vehicular windshield to prevent ice formation, wherein such ice formation typically is removed to permit adequate vision in use in a driving situation. Such devices are exemplified in U.S. Pat. No. 4,848,825 to Niernberger wherein an accordion type sheet member is mounted to an exterior surface of a vehicular windshield.

U.S. Pat. No. 4,768,823 to Martinez sets forth a windshield protector wherein a flexible transparent sheet is mounted to an exterior surface of an associated windshield.

U.S. Pat. No. 4,903,749 to Hanania sets forth an automotive protective cover for overlying a sun roof portion and windshield portion of a vehicle.

U.S. Pat. No. 4,726,406 to Weatherspoon sets forth a further example of a windshield cover with a vinyl sheet and a cloth backing are mounted to an exterior surface of a windshield.

U.S. Pat. No. 4,782,216 to Woodard provides for a vehicular windshield, including a heatable laminated portion.

As such, it may be appreciated that there continues to be a need for a new and improved automotive windshield deice apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of windshield deicing apparatus now present in the prior art, the present invention provides an automotive windshield deice apparatus wherein the same is selectively mounted to an interior surface of a vehicular windshield permitting heating of the apparatus preventing ice formation on the windshield. As such, the general purpose of the present invention, which will be described subsequently in greater detail, is to provide a new and improved automotive windshield deice apparatus which has all the advantages of the prior art windshield deicing apparatus and none of the disadvantages.

To attain this, the present invention provides a flexible sheet member mounted to an interior surface of a vehicular windshield, with the sheet member including a serpentine resistance heater directed therethrough in electrical communication with the associated vehicle. A rheostat effects selective heating in the resistance element. Further, a modification of the invention includes directional air conduits mounted to an interior surface of the sheet member to direct heated air within the passenger compartment, wherein the tubes include conduits, and the conduits each selectively mount a cap member at an upper terminal end thereof, wherein each cap member includes a pivotally mounted directing tube to selectively direct heated air throughout the vehicular passenger compartment.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive windshield deice apparatus which has all the advantages of the prior art windshield deicing apparatus and none of the disadvantages.

It is another object of the present invention to provide a new and improved automotive windshield deice apparatus which may be easily and efficiently manufactured and marketed.

It is a further object of the present invention to provide a new and improved automotive windshield deice apparatus which is of a durable and reliable construction.

An even further object of the present invention is to provide a new and improved automotive windshield deice apparatus which is susceptible of a low cost of manufacture with regard to both materials and labor, and which accordingly is then susceptible of low prices of sale to the consuming public, thereby making such automotive windshield deice apparatus economically available to the buying public.

Still yet another object of the present invention is to provide a new and improved automotive windshield deice apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of a modification of the invention.

FIG. 5 is an orthographic sectional view, taken along the lines 5—5 of FIG. 4 in the direction indicated by the arrows.

FIG. 6 is an isometric illustration of the modified invention mounting a cap structure to the directional conduits.

FIG. 7 is an orthographic view, taken along the lines 7—7 of FIG. 6 in the direction indicated by the arrows.

FIG. 8 is an isometric illustration illustrating the invention mounted to an interior surface of a vehicular windshield.

DESCRIPTION OF THE PREFERRED EMBODIMENT

Figure 1:
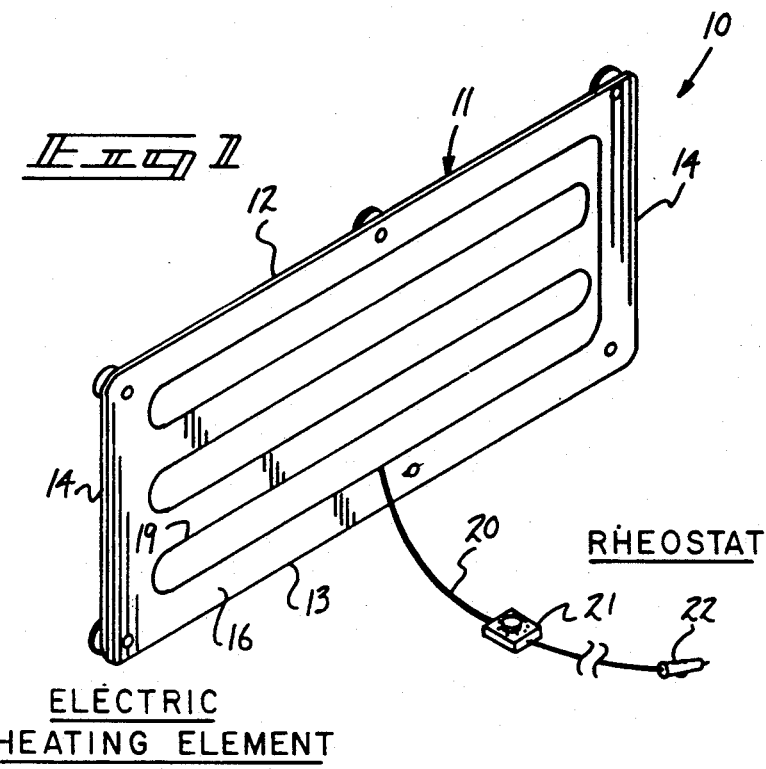
FIG. 1 is an isometric illustration of the instant invention.
Figure 2:
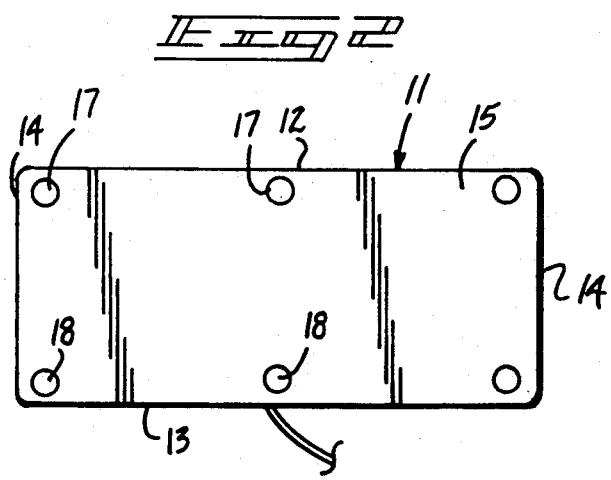
FIG. 2 is an orthographic frontal view of the instant invention.
Figure 3:
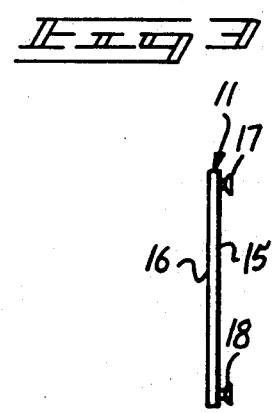
FIG. 3 is an orthographic side view of the instant invention.

With reference now to the drawings, and in particular to FIGS. 1 to 8 thereof, a new and improved automotive windshield deice apparatus embodying the principles and concepts of the present invention and generally designated by the reference numeral 10 will be described.

More specifically, the automotive windshield deice apparatus 10 of the instant invention essentially comprises a flexible sheet member 11 defined by a top edge 12 spaced from a bottom edge 13, with side edges 14 extending orthogonally between the top and bottom edges, which in turn are of a generally parallel relationship. The sheet member 11 defines a front sheet face 15 and a rear sheet face 16. The front sheet face 16 includes a first and second row of suction cup members 17 and 18 respectively arranged adjacent the respective top and bottom edges 12 and 13 mounted to the front face 15. The continuous electrical resistance heating coil 19 is mounted within the sheet member 11 extending coextensively within the sheet member and defined by a serpentine configuration to impart heating of the body of sheet member and thereby impart heating to an interior surface of an automotive or vehicular windshield 24, as illustrated in FIG. 8. An electrical power supply line 20 directs electrical energy into the heating coil 19 through a rheostat 21, wherein a cigarette lighter plug 22 of conventional construction is mounted at a free terminal end of the power supply line 20 for directing the plug within a cigarette lighter plug socket 23 of an associated vehicle, as illustrated in FIG. 8.

To heat the passenger compartment 25 (see FIG. 8) of a typical automotive vehicle, the invention as set forth in the FIGS. 4–7 is provided. To this end, a series of circulatory air tubes 26 are arranged in a parallel relationship relative to one another substantially coextensive between the side edges 14 of the sheet member mounted to the rear sheet face 16, wherein the air tubes 26 are oriented orthogonally relative to the top and bottom edges 12 and 13 extending therebetween. The air tubes each include a conduit 27, wherein the conduit 27 includes an exit opening 27a at an upper terminal end thereof and an entrance opening 27b at a lower terminal end of each air tube. A directional cap plug 28 is formed individually or as a series for mounting to the exit openings 27a of each of the air tubes 26. The cap plugs 28 each include a cap conduit 29 fixedly mounted defining a conduit therethrough, wherein a directing tube 30 is mounted to each cap conduit. Each directing tube includes a medial pivot junction 31 defined by an accordion pleated portion to permit orientation of the tube's upper terminal end. In this manner, upon heating of the sheet member 11 by the heating coil 19, heated air is directed upwardly through each of the conduits 27 and directed by the directing tubes 30 to various portions of the passenger compartment 25.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive windshield deice apparatus arranged for securement to a vehicular windshield to an interior surface of the vehicular windshield within a vehicular passenger compartment, wherein the apparatus comprises, a flexible sheet member, the flexible sheet member including a top edge spaced from and parallel a bottom edge, and spaced side edges, and the sheet member including a front sheet face and a rear sheet face, with the front sheet face arranged for confrontation with the vehicular windshield within the passenger compartment, and a serpentine continuous electrical resistance heating coil positioned within the sheet member extending between the top edge, bottom edge, and side edges, and the heating coil including an electrical supply line, and a rheostat mounted within the electrical supply line for directing selective electrical current to the heating coil, and a cigarette lighter plug mounted to a free terminal end of the electrical supply line remote from the sheet member for securement within a cigarette lighter socket positioned within the passenger compartment, and the front sheet face includes a first row of suction cup members mounted to the front sheet face adjacent the top edge, and a second row of suction cup members mounted to the front sheet face adjacent the bottom edge, and the rear sheet face includes a plurality of circulatory air tubes arranged in a parallel substantially coextensive relationship between the side edges, wherein the air tube extends orthogonally between the top edge and the bottom edge of the sheet member, and each air tube includes a conduit directed coextensively therethrough, wherein each conduit includes an exit opening adjacent the top edge of the sheet member and an entrance opening adjacent the bottom opening of the sheet member.

2. An apparatus as set forth in claim 1, wherein each conduit includes a cap plug selectively mounted to each exit opening of each conduit, and each cap plug includes a cap conduit directed therethrough, each cap conduit includes a directing tube secured to the cap conduit, each directing tube includes a medial pivot junction positioned medially of each directing tube, wherein each medial pivot junction is formed of a pleated tube portion to permit pivotment of an upper portion of the directing tube above the pivot junction relative to a lower directing tube portion positioned below the pivot junction between the pivot junction and the cap plug.

* * * * *